US011194636B2

(12) United States Patent
Flajslik et al.

(10) Patent No.: US 11,194,636 B2
(45) Date of Patent: Dec. 7, 2021

(54) TECHNOLOGIES FOR GENERATING TRIGGERED CONDITIONAL EVENTS

(71) Applicant: Intel Corporation, Santa Clara, CA (US)

(72) Inventors: Mario Flajslik, Hopkinton, MA (US); Keith D. Underwood, Powell, TX (US); Timo Schneider, Hudson, MA (US); James Dinan, Hudson, MA (US)

(73) Assignee: Intel Corporation, Santa Clara, CA (US)

( * ) Notice: Subject to any disclaimer, the term of this patent is extended or adjusted under 35 U.S.C. 154(b) by 738 days.

(21) Appl. No.: 15/941,509

(22) Filed: Mar. 30, 2018

(65) Prior Publication Data

US 2019/0042335 A1    Feb. 7, 2019

(51) Int. Cl.
*G06F 9/54*    (2006.01)

(52) U.S. Cl.
CPC .............. *G06F 9/542* (2013.01); *G06F 9/544* (2013.01); *G06F 9/546* (2013.01); *G06F 2209/548* (2013.01)

(58) Field of Classification Search
None
See application file for complete search history.

(56) References Cited

U.S. PATENT DOCUMENTS

2016/0149819 A1    5/2016 Hussain et al.
2016/0381120 A1*  12/2016 Flajslik
2018/0287954 A1   10/2018 Dinan et al.

OTHER PUBLICATIONS

"Fabric Collective Accelerator (FCA)" Mellanox Technologies, www.mellanox.com, 2014, 2 pages.
"Bull eXascale Interconnect for HPC Systems", Oct. 2017, downloaded from https://atos.net/wp-content/uploads/2017/10/W-BXI-en1-web-1.pdf on Mar. 4, 2021, 12 pages.
"Libfabric OpenFabrics", downloaded from http://web.archive.org/web/20170313110849/https:/ofiwg.github.io/libfabric/ on Mar. 9, 2021.
Barrett et al., "Using Triggered Operations to Offload Rendezvous Messages," Sandia National Laboratories, Sep. 2011, 8 pages.

(Continued)

*Primary Examiner* — Syed A Roni
(74) *Attorney, Agent, or Firm* — Compass IP Law, PC (57) ABSTRACT

Technologies for generating triggered conditional events operations include a host fabric interface (HFI) of a compute device configured to receive an operation execution command message associated with a triggered operation that has been fired, process the received operation execution command message to extract and store argument information from the received operation execution command, and increment an event counter associated with the fired triggered operation. The HFI is further configured to perform a triggered compare-and-generate event (TCAGE) operation as a function of the extracted argument information, determine whether to generate a triggering event, generate the triggering event as a function of the performed TCAGE operation, insert the generated triggered event into a triggered operation queue, and update the value of the event counter. Other embodiments are described herein.

25 Claims, 5 Drawing Sheets

(56) References Cited

OTHER PUBLICATIONS

Barrett et al., "The Portals 4.1 Network Programming Interface," Sandia National Laboratories Report, No. SAND2017-3825. Apr. 2017.
Flajslik et al., "On the Fence: An Offload Approach to Ordering One-Sided Communication," 2015 9th International Conference on Partitioned Global Address Space Programming Models, 2015, 12 pages.
Larkins et al., "Extending a Message Passing Runtime to Support Partitioned, Global Logical Address Spaces," COMHPC'16, IEEE, Nov. 2016, 7 pages.
Schneider et al., "Fast Networks and Slow Memories: A Mechanism for Mitigating Bandwidth Mismatches," 2017 IEEE 25th Annual Symposium on High-Performance Interconnects (HOTI), Aug. 28-30, 2017, 8 pages.
Schneider et al, "Protocols for Fully Offloaded Collective Operations on Accelerated Network Adapters," Parallel Processing (ICPP), 2013 42nd International Conference, Oct. 2013, 11 pages.
First Office Action for U.S. Appl. No. 15/859,389, dated Apr. 12, 2021, 9 pages.
First Office Action for U.S. Appl. No. 15/941,984, dated May 24, 2021, 6 pages.
Notice of Allowance for U.S. Appl. No. 15/859,389, dated Jul. 12, 2021, 9 pages.

\* cited by examiner

TECHNOLOGIES FOR GENERATING TRIGGERED CONDITIONAL EVENTS

STATEMENT REGARDING FEDERALLY SPONSORED RESEARCH

This invention was made with Government support under contract number H98230A-13-D-0124 awarded by the Department of Defense. The Government has certain rights in this invention.

BACKGROUND

Many high-performance computing (HPC) and datacenter applications are network latency sensitive with respect to the overall performance of the respective applications being executed thereon. One significant latency factor is the amount of time it takes to receive a response after posting a request. Oftentimes, the processing required to service the request is minimal. For example, simply receiving the response associated with the posted request in some collective communication patterns (e.g., tree-based barrier) could be sufficient to trigger a response. Accordingly, to enable applications to perform application-level offloading of communication patterns, host fabric interfaces (HFIs) typically rely on triggered operations, which are supported by various networking application programming interfaces (APIs), such as Portals (e.g., Portals 4 API), OpenFabrics Interfaces (OFI) libfabric, etc. Triggered operations are communication operations that are issued by the application and will be performed when a future communication event occurs. For example, a broadcast operation may be offloaded by issuing triggered operations which can be fired upon a future communication event having been detected, at which time data can be forwarded to the intended recipient. Further, by linking multiple triggered operations through sequences of events, it is possible to offload programs to the HFI.

However, various limitations exist in present implementations. For example, present triggered operation engines do not typically support conditional or branching operations. As such, offload programs constructed using triggered operations cannot contain dynamic decision points. Further, all decisions regarding the behaviors of the offload program are made statically, before the operations are posted. In other words, present triggered operation interfaces and hardware engines cannot generally be used to express arbitrary offload programs.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
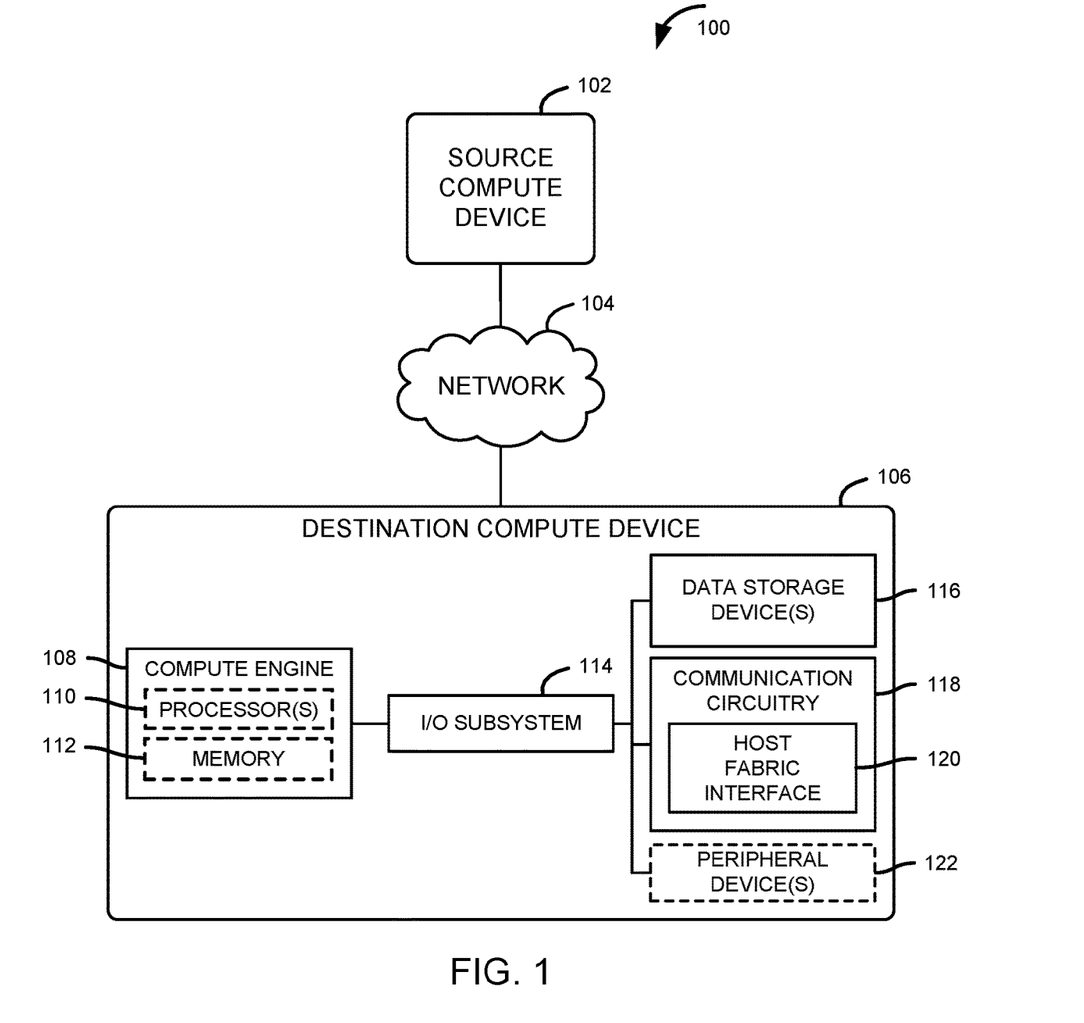
FIG. 1 is a simplified block diagram of at least one embodiment of a system for generating triggered conditional events operations that includes a source compute device and a destination compute device communicatively coupled via a network.

Referring now to FIG. 1, in an illustrative embodiment, a system 100 for generating triggered conditional events includes a source compute device 102 communicatively coupled to a destination compute device 106 via a network 104. While illustratively shown as having a single source compute device 102 and a single destination compute device 106, the system 100 may include multiple source compute devices 102 and multiple destination compute devices 106, in other embodiments. It should be appreciated that the source compute device 102 and destination compute device 106 have been illustratively designated herein as being one of a "source" and a "destination" for the purposes of providing clarity to the description and that the source compute device 102 and/or the destination compute device 106 may be capable of performing the functions described herein. It should be further appreciated that the source compute device 102 and the destination compute device 106 may reside in the same data center or high-performance computing (HPC) environment. In other words, the source compute device 102 and destination compute device 106 may reside in the same network 104 connected via one or more wired interconnects.

In use, the source compute device 102 and the destination compute device 106 transmit and receive network traffic (e.g., network packets, frames, etc.) to/from each other. Oftentimes, such communications are latency sensitive such that the overall performance of the application in particular environments depends on the amount of time it takes to receive a response to a transmitted network packet. For example, the destination compute device 106 may receive a network packet from the source compute device 102. Upon receipt of a network packet, the destination compute device 106 typically identifies how to process the network packet. To do so, the destination compute device 106 generally relies on one or more instructions previously received from an application which are usable to identify how to process the network packet, such that at least a portion of the data associated with the received network packet (e.g., the payload of the network packet, an indication of receipt of the network packet, etc.) can be accessed by the application. Such processing of the network packet can include application-level offloading of communication patterns associated with the network packet to the network interface of the destination compute device 106. The offloading of such communication patterns (i.e., onto the network interface) can reduce many of the latencies which are inherent in network communications and, consequently, reduce the amount of time taken to perform the offloaded operations.

To manage the timing of the offload operations, the application may rely on one or more hardware-supported triggered operations, each of which are associated with a triggering event (e.g., a network communication related event, a network packet processing event, etc.). Triggered operations include operations which are issued by an application and will be performed when a future event or series of events occur. For example, a triggered operation may be a communication operation issued by the application and is to be performed upon the occurrence of a future communication event or series of communication events. In an illustrative example, a broadcast operation can be offloaded by issuing triggered operations which will be fired and forward data after the message has been received (e.g., from a parent node in a broadcast tree). Oftentimes, the amount of processing required to service a particular request is minimal. For example, the processing required to service the request may be prompted by having received the network packet, as in some collective communication patterns (e.g., tree-based communication patterns), or a processing condition/action associated therewith.

Unlike present triggered operation interfaces which do not support dynamic changes in control flow (i.e., making such solutions incomplete for expressing general offload programs for a broad category of communication patterns), the destination compute device 106 as described herein is configured to generate triggered conditional events without software intervention. To do so, in use, the destination compute device 106 is configured to use a new triggered conditional event generation operation (i.e., a triggered compare-and-generate event (TCAGE)) that evaluates a comparison of values in memory and, when the comparison results in a "true" value, the destination compute device 106 is configured to generate a triggering event. Accordingly, the resulting triggering event can selectively enable a triggered operation or a sequence of triggered operations.

The destination compute device 106 may be embodied as any type of computation or computer device capable of performing the functions described herein, including, without limitation, a computer, a server (e.g., stand-alone, rack-mounted, blade, etc.), a sled (e.g., a compute sled, an accelerator sled, a storage sled, a memory sled, etc.), an enhanced network interface controller (NIC) (e.g., a host fabric interface (HFI)), a network appliance (e.g., physical or virtual), a router, switch (e.g., a disaggregated switch, a rack-mounted switch, a standalone switch, a fully managed switch, a partially managed switch, a full-duplex switch, and/or a half-duplex communication mode enabled switch), a web appliance, a distributed computing system, a processor-based system, and/or a multiprocessor system.

As shown in FIG. 1, the illustrative destination compute device 106 includes a compute engine 108, an I/O subsystem 114, one or more data storage devices 116, communication circuitry 118, and, in some embodiments, one or more peripheral devices 122. It should be appreciated that the destination compute device 106 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component.

The compute engine 108 may be embodied as any type of device or collection of devices capable of performing the various compute functions as described herein. In some embodiments, the compute engine 108 may be embodied as a single device such as an integrated circuit, an embedded system, a field-programmable-array (FPGA), a system-on-a-chip (SOC), an application specific integrated circuit (ASIC), reconfigurable hardware or hardware circuitry, or other specialized hardware to facilitate performance of the functions described herein. Additionally, in some embodiments, the compute engine 108 may include, or may be embodied as, one or more processors 110 (i.e., one or more central processing units (CPUs)) and memory 112.

The processor(s) 110 may be embodied as any type of processor capable of performing the functions described herein. For example, the processor(s) 110 may be embodied as one or more single-core processors, one or more multi-core processors, a digital signal processor, a microcontroller, or other processor or processing/controlling circuit(s). In some embodiments, the processor(s) 110 may be embodied as, include, or otherwise be coupled to a field programmable gate array (FPGA), an application specific integrated circuit (ASIC), reconfigurable hardware or hardware circuitry, or other specialized hardware to facilitate performance of the functions described herein.

The memory 112 may be embodied as any type of volatile (e.g., dynamic random access memory (DRAM), etc.) or non-volatile memory or data storage capable of performing the functions described herein. It should be appreciated that the memory 112 may include main memory (i.e., a primary memory) and/or cache memory (i.e., memory that can be accessed more quickly than the main memory). Volatile memory may be a storage medium that requires power to maintain the state of data stored by the medium. Non-limiting examples of volatile memory may include various types of random access memory (RAM), such as dynamic random access memory (DRAM) or static random access memory (SRAM).

The compute engine 108 is communicatively coupled to other components of the destination compute device 106 via the I/O subsystem 114, which may be embodied as circuitry and/or components to facilitate input/output operations with the processor 110, the memory 112, and other components of the destination compute device 106. For example, the I/O subsystem 114 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 114 may form a portion of a system-on-a-chip (SoC) and be incorporated, along with one or more of the processor 110, the memory 112, and other components of the destination compute device 106, on a single integrated circuit chip.

The one or more data storage devices 116 may be embodied as any type of storage device(s) configured for short-term or long-term storage of data, such as, for example, memory devices and circuits, memory cards, hard disk drives, solid-state drives, or other data storage devices. Each data storage device 116 may include a system partition that stores data and firmware code for the data storage device 116. Each data storage device 116 may also include an operating system partition that stores data files and executables for an operating system.

The communication circuitry 118 may be embodied as any communication circuit, device, or collection thereof, capable of enabling communications between the destination compute device 106 and other computing devices, such as the source compute device 102, as well as any network communication enabling devices, such as an access point, network switch/router, etc., to allow communication over the network 104. Accordingly, the communication circuitry 118 may be configured to use any one or more communication technologies (e.g., wireless or wired communication technologies) and associated protocols (e.g., Ethernet, Bluetooth®, Wi-Fi®, WiMAX, LTE, 5G, etc.) to effect such communication.

It should be appreciated that, in some embodiments, the communication circuitry 118 may include specialized circuitry, hardware, or combination thereof to perform pipeline logic (e.g., hardware algorithms) for performing the functions described herein, including applying the hash functions, processing network packets (e.g., parse received network packets, determine destination computing devices for each received network packets, forward the network packets to a particular buffer queue of a respective host buffer of the destination compute device 106, etc.), performing computational functions, etc.

In some embodiments, performance of one or more of the functions of communication circuitry 118 as described herein may be performed by specialized circuitry, hardware, or combination thereof of the communication circuitry 118, which may be embodied as a system-on-a-chip (SoC) or otherwise form a portion of a SoC of the destination compute device 106 (e.g., incorporated on a single integrated circuit chip along with a processor 110, the memory 112, and/or other components of the destination compute device 106). Alternatively, in some embodiments, the specialized circuitry, hardware, or combination thereof may be embodied as one or more discrete processing units of the destination compute device 106, each of which may be capable of performing one or more of the functions described herein.

The illustrative communication circuitry 118 includes an HFI 120, which may also be referred to as a network interface controller (NIC) in some embodiments. The HFI 120 may be embodied as one or more add-in-boards, daughtercards, network interface cards, controller chips, chipsets, or other devices that may be used by the destination compute device 106 to connect with another compute device (e.g., the source compute device 102). In some embodiments, the HFI 120 may be embodied as part of a system-on-a-chip (SoC) that includes one or more processors, or included on a multichip package that also contains one or more processors. In some embodiments, the HFI 120 may include a local processor (not shown) and/or a local memory (not shown) that are both local to the HFI 120. In such embodiments, the local processor of the HFI 120 may be capable of performing one or more of the functions of a processor 110 described herein. Additionally or alternatively, in such embodiments, the local memory of the HFI 120 may be integrated into one or more components of the destination compute device 106 at the board level, socket level, chip level, and/or other levels.

The one or more peripheral devices 122 may include any type of device that is usable to input information into the destination compute device 106 and/or receive information from the destination compute device 106. The peripheral devices 122 may be embodied as any auxiliary device usable to input information into the destination compute device 106, such as a keyboard, a mouse, a microphone, a barcode reader, an image scanner, etc., or output information from the destination compute device 106, such as a display, a speaker, graphics circuitry, a printer, a projector, etc. It should be appreciated that, in some embodiments, one or more of the peripheral devices 122 may function as both an input device and an output device (e.g., a touchscreen display, a digitizer on top of a display screen, etc.). It should be further appreciated that the types of peripheral devices 122 connected to the destination compute device 106 may depend on, for example, the type and/or intended use of the destination compute device 106. Additionally or alternatively, in some embodiments, the peripheral devices 122 may include one or more ports, such as a USB port, for example, for connecting external peripheral devices to the destination compute device 106.

The source compute device 102 may be embodied as any type of computation or computer device capable of performing the functions described herein, including, without limitation, a mobile computing device (e.g., a smartphone, a tablet computer, a laptop computer, a notebook computer, a wearable, etc.), a desktop computer, a server (e.g., stand-alone, rack-mounted, blade, etc.), a sled (e.g., a compute sled, an accelerator sled, a storage sled, a memory sled, etc.), a network appliance (e.g., physical or virtual), a web appliance, a distributed computing system, a processor-based system, and/or a multiprocessor system. While not illustratively shown, it should be appreciated that source compute device 102 includes similar and/or like components to those of the illustrative destination compute device 106. As such, figures and descriptions of the like components are not repeated herein for clarity of the description with the understanding that the description of the corresponding components provided above in regard to the destination compute device 106 applies equally to the corresponding components of the source compute device 102. Of course, it should be appreciated that either of the computing devices (i.e., the source compute device 102 and/or the destination compute device 106) may include additional and/or alternative components, depending on the embodiment.

The network 104 may be embodied as any type of wired or wireless communication network, including but not limited to a wireless local area network (WLAN), a wireless personal area network (WPAN), a cellular network (e.g., Global System for Mobile Communications (GSM), Long-Term Evolution (LTE), etc.), a telephony network, a digital subscriber line (DSL) network, a cable network, a local area network (LAN), a wide area network (WAN), a global network (e.g., the Internet), or any combination thereof. It should be appreciated that, in such embodiments, the network 104 may serve as a centralized network and, in some embodiments, may be communicatively coupled to another network (e.g., the Internet). Accordingly, the network 104 may include a variety of other virtual and/or physical network computing devices (e.g., routers, switches, network hubs, servers, storage devices, compute devices, etc.), as needed to facilitate communication between the destination compute device 106 and the source compute device 102, which are not shown to preserve clarity of the description.

Figure 2:
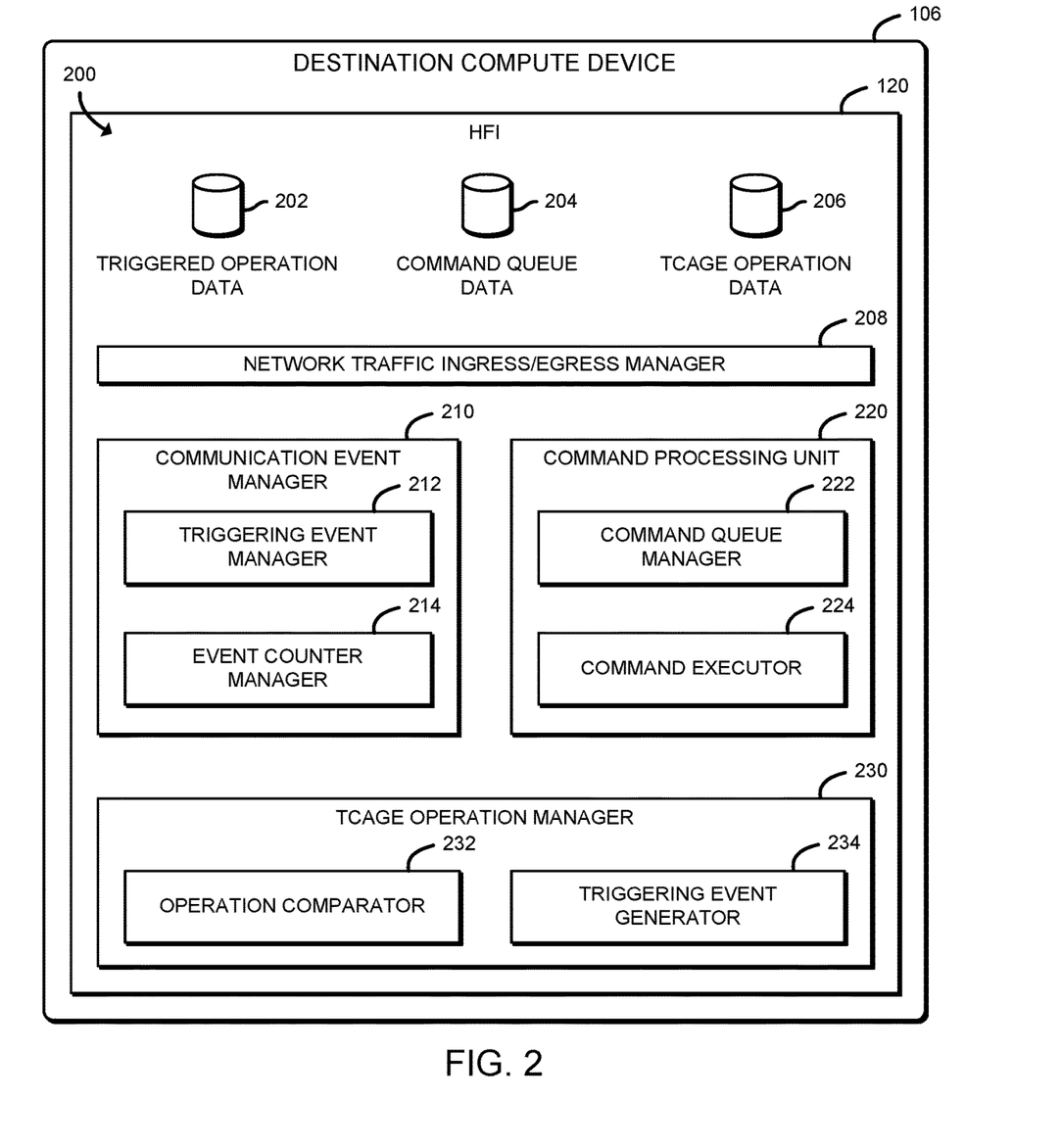
FIG. 2 is a simplified block diagram of at least one embodiment of an environment of the destination compute device of the system of FIG. 1.

Referring now to FIG. 2, in use, the destination compute device 106 establishes an environment 200 during operation. The illustrative environment 200 includes a network traffic ingress/egress manager 208, a communication event manager 210, a command processing unit 220, and a TCAGE operation manager 230. The various components of the environment 200 may be embodied as hardware, firmware, software, or a combination thereof. As such, in some embodiments, one or more of the components of the environment 200 may be embodied as circuitry or collection of electrical devices (e.g., network traffic ingress/egress management circuitry 208, communication event management circuitry 210, command processing circuitry 220, TCAGE operation management circuitry 230, etc.).

As illustratively shown, the network traffic ingress/egress management circuitry 208, the communication event management circuitry 210, the command processing circuitry 220, and the TCAGE operation management circuitry 230 form a portion of the HFI 120. However, it should be appreciated that, in other embodiments, one or more functions of the network traffic ingress/egress management circuitry 208, the communication event management circuitry 210, the command processing circuitry 220, and the TCAGE operation management circuitry 230 as described herein may form a portion of one or more of the compute engine 108, the I/O subsystem 114, the communication circuitry 118, and/or other components of the destination compute device 106.

Additionally, in some embodiments, one or more of the illustrative components may form a portion of another component and/or one or more of the illustrative components may be independent of one another. For example, in some embodiments, the TCAGE operation manager 230 may form a portion of the communication event manager 210. Further, in some embodiments, one or more of the components of the environment 200 may be embodied as virtualized hardware components or emulated architecture, which may be established and maintained by the HFI 120, the compute engine 108, or other components of the destination compute device 106. It should be appreciated that the destination compute device 106 may include other components, sub-components, modules, sub-modules, logic, sub-logic, and/or devices commonly found in a computing device, which are not illustrated in FIG. 2 for clarity of the description.

In the illustrative environment 200, the destination compute device 106 additionally includes triggered operation data 202, command queue data 204, and TCAGE operation data 206, each of which may be accessed by the various components and/or sub-components of the destination compute device 106. Additionally, it should be appreciated that in some embodiments the data stored in, or otherwise represented by, each of the triggered operation data 202, the command queue data 204, and the TCAGE operation data 206 may not be mutually exclusive relative to each other. For example, in some implementations, data stored in the triggered operation data 202 may also be stored as a portion of one or more of the command queue data 204 and/or the TCAGE operation data 206, or vice versa. As such, although the various data utilized by the destination compute device 106 is described herein as particular discrete data, such data may be combined, aggregated, and/or otherwise form portions of a single or multiple data sets, including duplicative copies, in other embodiments.

The network traffic ingress/egress manager 208, which may be embodied as hardware, firmware, software, virtualized hardware, emulated architecture, and/or a combination thereof as discussed above, is configured to receive inbound and route/transmit outbound network traffic. To do so, the illustrative network traffic ingress/egress manager 208 is configured to facilitate inbound network communications (e.g., network traffic, network packets, network flows, etc.) to the destination compute device 106. Accordingly, the network traffic ingress/egress manager 208 is configured to manage (e.g., create, modify, delete, etc.) connections to physical and virtual network ports (i.e., virtual network interfaces) of the destination compute device 106 (e.g., via the communication circuitry 118), as well as the ingress buffers/queues associated therewith. Additionally, the network traffic ingress/egress manager 208 is configured to facilitate outbound network communications (e.g., network traffic, network packet streams, network flows, etc.) from the destination compute device 106. To do so, the network traffic ingress/egress manager 208 is configured to manage (e.g., create, modify, delete, etc.) connections to physical and virtual network ports/interfaces of the destination compute device 106 (e.g., via the communication circuitry 118), as well the egress buffers/queues associated therewith.

The communication event manager 210, which may be embodied as hardware, firmware, software, virtualized hardware, emulated architecture, and/or a combination thereof as discussed above, is configured to manage the relationship between triggered operations and received communication events. To do so, the illustrative communication event manager 210 includes a triggering event manager 212 and an event counter manager 214. The triggering event manager 212 is configured to determine whether an event corresponds to, or is otherwise mapped to, a particular counter, and if so, notify the event counter manager 214. Accordingly, the event counter manager 214 is configured to manage the event counters (i.e., increment the counters). To do so, the event counter manager 214 is configured to allocate and initialize the event counters (e.g., in response to a request received from a corresponding software application) and update the event counters (e.g., by an increment of one). In some embodiments, the event counter values and/or mapping information may be included in the triggered operation data 202.

It should be appreciated that each of the triggering event manager 212 and the event counter manager 214 of the illustrative communication event manager 210 may be separately embodied as hardware, firmware, software, virtualized hardware, emulated architecture, and/or a combination thereof. For example, the triggering event manager 212 may be embodied as a hardware component, while the event counter manager 214 may be embodied as a virtualized hardware component or as some other combination of hardware, firmware, software, virtualized hardware, emulated architecture, and/or a combination thereof.

The command processing unit 220, which may be embodied as hardware, firmware, software, virtualized hardware, emulated architecture, and/or a combination thereof as discussed above, is configured to process the commands, or instructions, associated with a triggered operation that has been fired (e.g., such as may be received from the communication event manager 210). It should be appreciated that such commands may be received from the host (e.g., via an interface between the HFI 120 and a processor 110 of the compute engine 108) or from a pending queue of triggered operations managed local to the HFI 120. To do so, the illustrative command processing unit 220 includes a command queue manager 222 and a command executor 224. The command queue manager 222 is configured to receive commands which indicate to the command processing unit 220 which processes are to be conducted on what data as a function of a triggered operation having been triggered. Upon receipt of each command, the command queue manager 222 is configured to queue the command into the applicable queue (e.g., relative to a priority of the command, a priority of the triggering event, the type of offload being performed as a function of the command, etc.). The command executor 224 is configured to execute the commands (e.g., offloading command(s) to the appropriate accelerator, fetching/setting data, etc.). In some embodiments, the command queue and/or information related thereto may be stored in the command queue data 204.

It should be appreciated that each of the command queue manager 222 and the command executor 224 of the illustrative command processing unit 220 may be separately embodied as hardware, firmware, software, virtualized hardware, emulated architecture, and/or a combination thereof. For example, the command queue manager 222 may be embodied as a hardware component, while the command executor 224 may be embodied as a virtualized hardware component or as some other combination of hardware, firmware, software, virtualized hardware, emulated architecture, and/or a combination thereof.

The TCAGE operation manager 230, which may be embodied as hardware, firmware, software, virtualized hardware, emulated architecture, and/or a combination thereof as discussed above, is configured to manage the TCAGE operations. To do so, the illustrative TCAGE operation manager 230 includes an operation comparator 232 and a triggering event generator 234. The operation comparator 232 is configured to perform a comparison as a function of a TCAGE operation. For example, the operation comparator 232 may be configured to compare two values having a particular data type, such as an integer value, a Boolean value, an operation type, etc. In some embodiments, one or both of the values may be stored in memory, retrieved from a received message, extracted from a header or payload of a network packet, etc. Additionally, in some embodiments, the operation comparator 232 may be configured to apply a mask to one or more of the values prior to performing the comparison.

The triggering event generator 234 is configured to generate triggering events as a function of a result of a TCAGE operation (e.g., as managed by the TCAGE operation manager 230). The triggering event generator 234 is additionally configured to update a value of an event counter upon generating triggering events. To do so, the TCAGE operation manager 230 may increment the event counter value, add an arbitrary or predefined constant value (e.g., positive or negative) to the event counter value, add a value from memory to the event counter value, or set the event counter value to a constant or value from a value in memory.

In an illustrative example in which the TCAGE operation manager 230 (e.g., via the operation comparator 232) compares two values stored in memory, if the result of the comparison is true, the TCAGE operation manager 230 (e.g., via the triggering event generator 234) generates an event and updates the value of the appropriate event counter. It should be appreciated that the generated triggering event can selectively enable a triggered operation or sequence of operations. Accordingly, unlike present technologies which require software intervention, the TCAGE operation manager 230 can offload/accelerate a variety of operations without software intervention. In some embodiments, information about the TCAGE operations and/or the values/result of the comparison may be stored in the TCAGE operation data 206.

It should be appreciated that each of the operation comparator 232 and the triggering event generator 234 of the illustrative TCAGE operation manager 230 may be separately embodied as hardware, firmware, software, virtualized hardware, emulated architecture, and/or a combination thereof. For example, the operation comparator 232 may be embodied as a hardware component, while the triggering event generator 234 may be embodied as a virtualized hardware component or as some other combination of hardware, firmware, software, virtualized hardware, emulated architecture, and/or a combination thereof. It should be further appreciated that, in some embodiments, one or more of the components and/or modules described herein may form a portion of another one or more of the components and/or modules described herein. For example, in some embodiments, the TCAGE operation manager 230 may form a component or sub-component of the command executor 224. In other words, in such embodiments, the command executor 224 may be extended (i.e., by the TCAGE operation manager 230) to support existing triggered operations in order to support TCAGE operations.

Figure 3:
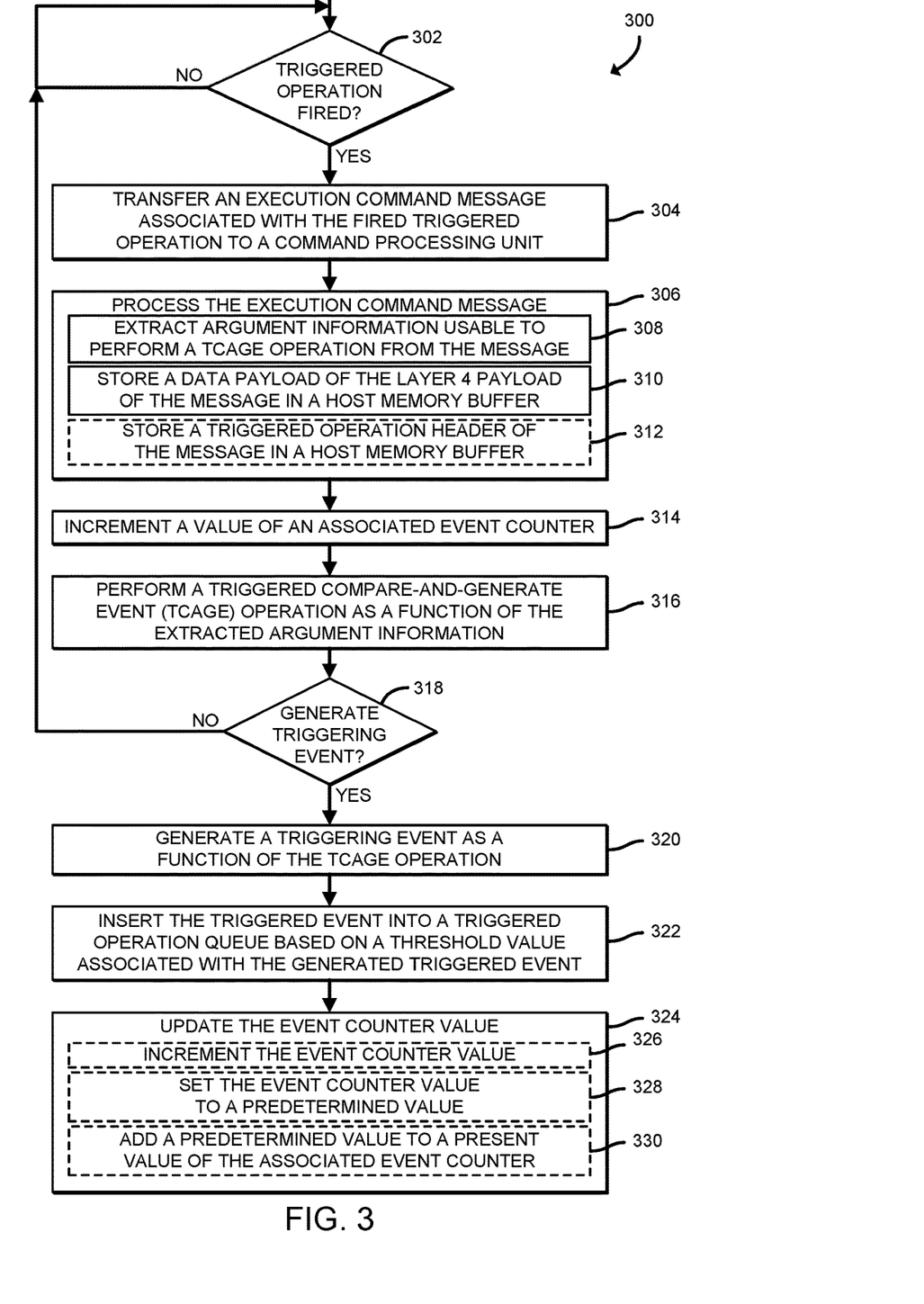
FIG. 3 is a simplified flow diagram of at least one embodiment of a method for generating triggered conditional events using triggered compare-and-generate event (TCAGE) operations that may be executed by the destination compute device of FIGS. 1 and 2.

Referring now to FIG. 3, a method 300 for generating triggered conditional events using TCAGE operations is shown which may be executed by a compute device (e.g., the destination compute device 106 of FIGS. 1 and 2), or more particularly by an HFI of the compute device (e.g., the HFI 120 of FIG. 2). The method 300 begins with block 302, in which the HFI 120 determines whether a triggered operation has been fired, such as may result from an event counter value having matched a trigger threshold associated with the triggered operation. If so, the method 300 advances to block 304, in which the HFI 120 transfers an operation execution command to a command processing unit (e.g., the command processing unit 220 of FIG. 2) of the HFI 120. The operation execution command includes one or more commands associated with the fired triggered operation which are to be performed as a result of the triggered operation having been fired.

In block 306, the HFI 120 processes the execution command message. In an illustrative embodiment, the execution command message may include a layer 4 header and payload. The layer 4 payload includes a data payload and one or more arguments associated with the fired triggered operation. Accordingly, in block 308, the HFI 120 extracts argument information usable to perform a TCAGE operation from the payload of the execution command message. In some embodiments, in addition to the data payload, the layer 4 payload may include a triggered operations header which contains the arguments associated with the fired triggered operation. Accordingly, in such embodiments, the HFI 120 may extract the argument information from the triggered operations header. In block 310, the HFI 120 stores the data payload in a host memory buffer (e.g., in the memory 112 of the compute engine 108 of FIG. 1). In some embodiments in which the payload includes the triggered operations header, in block 312, the HFI 120 may additionally store the triggered operations header in the host memory buffer. It should be appreciated that, in such embodiments, the data payload and the triggered operations header may be stored in the same memory buffer or different memory buffers, depending on the embodiment. For example, an I/O vector may be used on a match list entry of a match list of a matching list table to determine in which buffer each of the data payload and the triggered operations header are to be stored.

In block 314, the HFI 120 increments an event counter associated with the fired triggered operation. In block 316, the HFI 120 performs a TCAGE operation (i.e., a comparison) as a function of the extracted argument information (see, e.g., method 400 of FIG. 4 and method 500 of FIG. 5). In block 318, the HFI 120 determines whether to generate a triggering event as a result of the TCAGE operation. If not, the method 300 returns to block 302 to determine whether another triggering operation has fired; otherwise, the method 300 advances to block 320. In block 320, the HFI 120 generates a triggering event as a function of the TCAGE operation. In block 322, the HFI 120 inserts the triggered event into a triggered operation queue based on a threshold value associated with the generated triggered event. In block 324, the HFI 120 updates the associated event counter as a function of the TCAGE operation. For example, in block 326, in some embodiments, the HFI 120 may increment the event counter value. In another example, in block 328, in other embodiments, the HFI 120 may set the event counter value to a predetermined value (e.g., stored in memory). In still another example, in block 330, the HFI 120 may add a predetermined value (e.g., a positive or negative value which may be stored in memory) to the event counter value.

Figure 4:
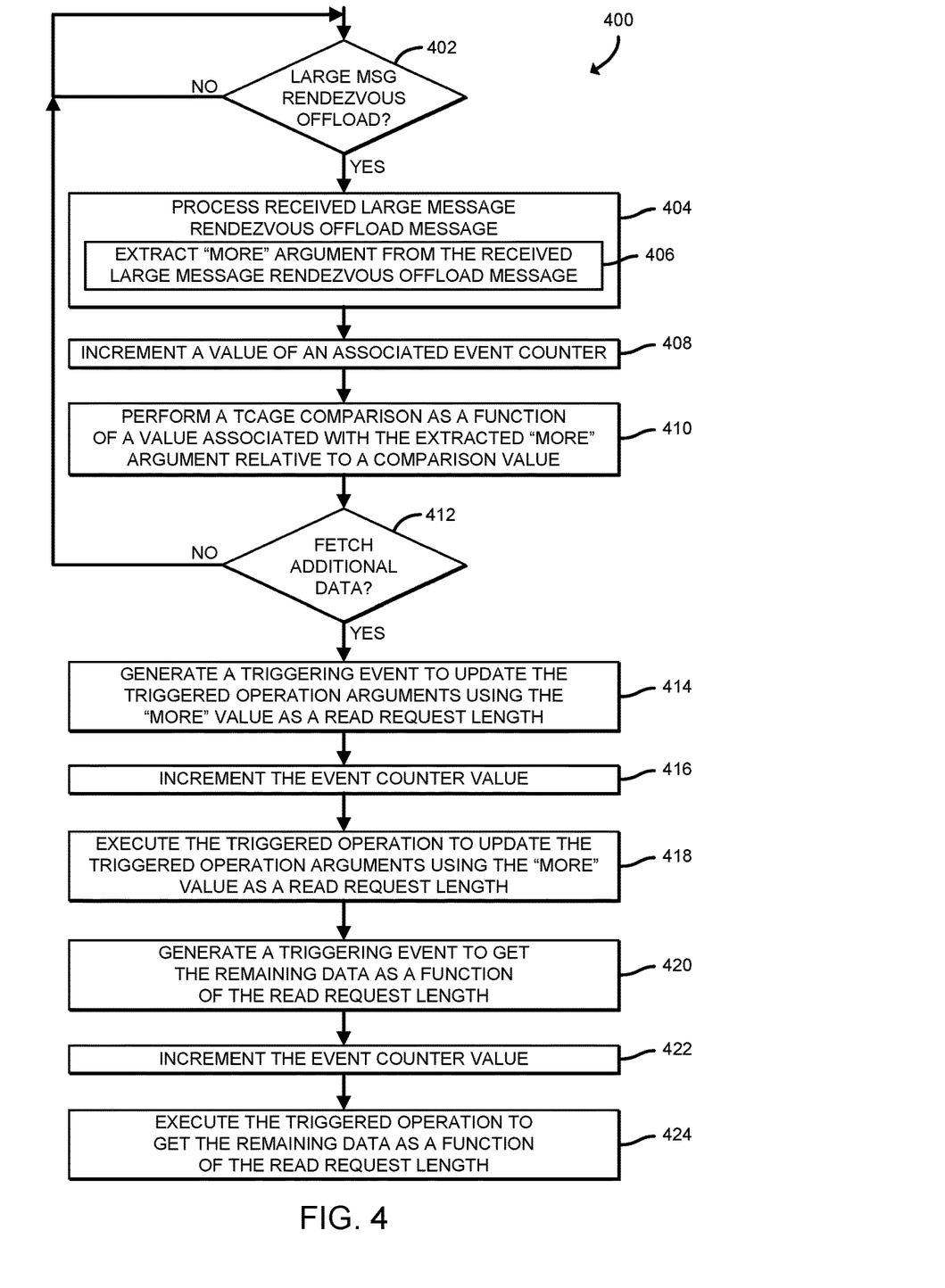
FIG. 4 is a simplified flow diagram of at least one embodiment of a method for implementing a rendezvous protocol for transferring large messages using TCAGE operations that may be executed by the destination compute device of FIGS. 1 and 2.

Referring now to FIG. 4, a method 400 for implementing a rendezvous protocol for transferring large messages using TCAGE operations is shown which may be executed by a compute device (e.g., the destination compute device 106 of FIGS. 1 and 2), or more particularly by an HFI of the compute device (e.g., the HFI 120 of FIG. 2). The method 400 begins with block 402, in which the HFI 120 determines whether a large message rendezvous offload has been initiated (i.e., a large message rendezvous offload message has been received). If so, the method 400 advances to block 404, in which the HFI 120 processes the received large message rendezvous offload message. As described previously, processing the message includes buffering the layer 4 payload of the received message, which includes the data payload and may also include a triggered operation header, in host memory. As also described previously, the data payload, or the triggered operation header, depending on the embodiment, includes argument information usable to perform the TCAGE operation which is extracted during the processing sequence. Accordingly, in block 406, the HFI 120 extracts a "more" argument from the received large message rendezvous offload message.

In block 408, the HFI 120 increments a value of an event counter associated with the triggered large message rendezvous offload operation. In block 410, the HFI 120 performs a TCAGE comparison as a function of a value associated with the extracted "more" argument relative to a comparison value. For example, the "more" argument value may be one of zero or a positive integer value greater than zero representing an additional number of Bytes of data which are to be fetched. In block 412, the HFI 120 determines whether additional data is to be fetched as a function of the TCAGE comparison. If not, the method 400 returns to block 402 to determine whether another large message rendezvous offload has been initiated; otherwise, the method 400 advances to block 414. In furtherance of the previous example, if the argument value is zero (i.e., there is no more additional data to be fetched), the method 400 would return to block 402; otherwise, if the argument value is greater than zero (i.e., additional data is to be fetched), the method 400 advances to block 414.

In block 414, the HFI 120 generates a triggering event to update the triggered operation arguments using the "more" argument value as a read (e.g., remote direct memory access (RDMA)) request length. In block 416, the HFI 120 increments the event counter value (i.e., to trigger the modifying triggered operation referenced in block 414). In block 418, the HFI 120 executes, in response to the event counter associated with the triggered operation to update the triggered operation arguments having been incremented, the triggered operation to update the triggered operation arguments using the "more" value as a read request length. In block 420, the HFI 120 generates a triggering event to get the remaining data as a function of the read request length. In block 422, the HFI 120 increments the event counter value. In block 424, the HFI 120 executes, in response to the event counter associated with the triggered operation to get the remaining data having been incremented, the triggered operation to get the remaining data as a function of the read request length (i.e., issues the RDMA request as a function of the "more" value as the read request length).

Figure 5:
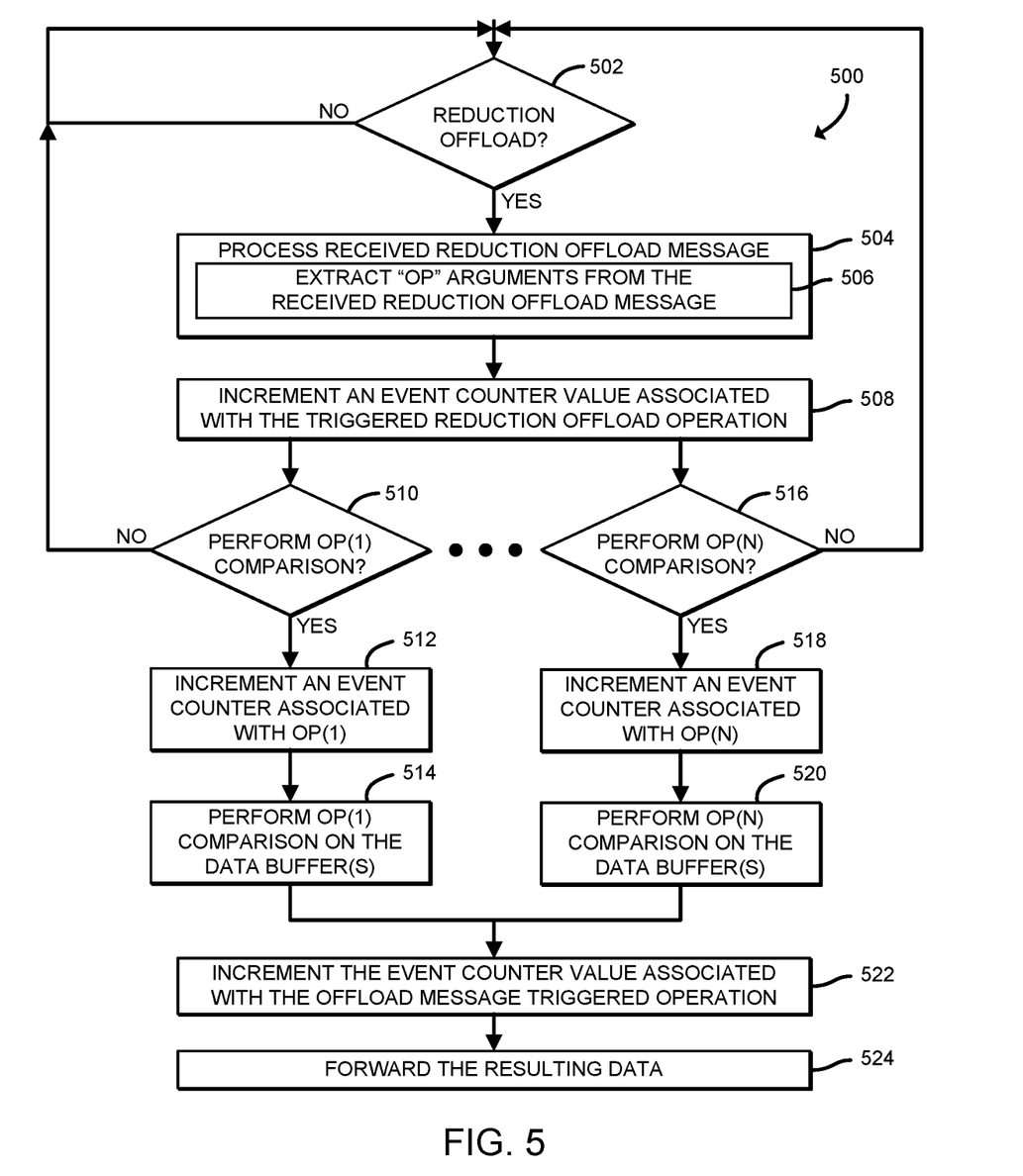
FIG. 5 is a simplified flow diagram of at least one embodiment of a method for generating triggered conditional events for a common reduction tree using TCAGE operations that may be executed by the destination compute device of FIGS. 1 and 2.

Referring now to FIG. 5, a method 500 for generating triggered conditional events for a common reduction tree using TCAGE operations is shown which may be executed by a compute device (e.g., the destination compute device 106 of FIGS. 1 and 2), or more particularly by an HFI of the compute device (e.g., the HFI 120 of FIG. 2). The method 500 begins with block 502, in which the HFI 120 determines whether a reduction offload has been initiated (i.e., a reduction offload message has been received). If so, the method 500 advances to block 504, in which the HFI 120 processes the received reduction offload message. As described previously, processing the message includes buffering the layer 4 payload of the received message, which includes the data payload and may also include a triggered operation header, in host memory. As also described previously, the data payload, or the triggered operation header, depending on the embodiment, includes argument information usable to perform the TCAGE operation which is extracted during the processing sequence. Accordingly, in block 506, the HFI 120 extracts an "op" argument from the received reduction offload message.

In block 508, the HFI 120 increments a value of an event counter associated with the triggered reduction offload operation. In blocks 510 and 516, the HFI 120 performs, in parallel, TCAGE comparisons as a function of the operation type associated with the extracted "op" argument. For example, the operation type may be any type of mathematical operation which can be used in a reduction operation, such as maximum, minimum, sum, product, etc. As such, it should be appreciated that more than one TCAGE comparison is performed as a result of the triggered reduction offload operation; however, only one will succeed (i.e., only one supported reduction operation will be performed). As illustratively shown, a first supported reduction operation type, designated as OP(1), and a second supported reduction operation type, designation as OP(N), is shown (e.g., in which the OP(N) represents the "Nth" supported reduction operation type and wherein "N" is a positive integer). While the method 500 is illustratively shown as including mathematical/reduction operations, it should be appreciated that any categorical data type may be used as a basis of the TCAGE comparison as described herein.

In block 510, the HFI 120 performs a TCAGE comparison to determine whether the extracted "op" argument corresponds to OP(1). If not, the method 500 returns to block 502 to determine whether another reduction offload has been fired; otherwise, the method 500 advances to block 512. In block 512, the HFI 120 increments a value of an event counter associated with OP(1) (i.e., to trigger the triggered operation which is triggered based on the value of the event counter associated with OP(1)). In block 514, in response to having detected the event counter associated with OP(1) having been incremented, the HFI 120 performs a reduction operation as a function of the operation type associated with the OP(1) and the data values (e.g., quantitative data) presently stored in the data buffer(s) in which the data payload has been stored.

Similarly, in block 516, the HFI 120 performs a TCAGE comparison to determine whether the extracted "op" argument corresponds to OP(N). If not, the method 500 returns to block 502 to determine whether another reduction offload has been fired; otherwise, the method 500 advances to block 518. In block 518, the HFI 120 increments a value of an event counter associated with OP(N) (i.e., to trigger the triggered operation which is triggered based on the value of the event counter associated with OP(N)). In block 520, in response to having detected the event counter associated with OP(N) having been incremented, the HFI 120 performs a reduction operation as a function of the operation type associated with the OP(N) and the data values presently stored in the data buffer(s) in which the data payload has been stored.

From blocks 514 and 520, the method 500 advances to block 522, in which the HFI 120 increments the value of the event counter associated with the offload message triggered operation. In block 524, the HFI 120 forwards the resulting data to the requesting entity (e.g., software application) associated with the triggered reduction offload operation. It should be appreciated that a given processor may be one of multiple processors that are reducing (e.g., combining using "op" arguments) values from each processor to form a single result (e.g. sum or max across all processors). As such, it should be further appreciated that the resulting data may be forwarded to a parent process in a communication tree or, if the processor is the destination (a.k.a. the root of the communication tree), the data may be delivered to the software application.

EXAMPLES

Illustrative examples of the technologies disclosed herein are provided below. An embodiment of the technologies may include any one or more, and any combination of, the examples described below.

Example 1 includes a compute device for generating triggered conditional events operations, the compute device comprising a compute engine; and a host fabric interface (HFI) to receive an operation execution command message associated with a triggered operation that has been fired; process the received operation execution command message to (i) extract argument information from a payload of the received operation execution command and (ii) store the argument information in a data buffer of the compute engine; increment a value of an event counter associated with the fired triggered operation; perform a triggered compare-and-generate event (TCAGE) operation as a function of the extracted argument information; determine, in response to having performed TCAGE operation, whether to generate a triggering event; generate, in response to a determination that the triggering event is to be generated, the triggering event as a function of the performed TCAGE operation; insert the generated triggered event into a triggered operation queue; and update the value of the event counter.

Example 2 includes the subject matter of Example 1, and wherein to process the received operation execution command message to extract argument information from the received operation execution command comprises to process the received operation execution command message to extract argument information from a payload of the received operation execution command.

Example 3 includes the subject matter of any of Examples 1 and 2, and wherein to process the operation execution command message comprises to store a data payload of the transport layer payload of the received operation execution command message in a memory buffer of the compute engine.

Example 4 includes the subject matter of any of Examples 1-3, and wherein to process the operation execution command message comprises to store a triggered operation header of the received operation execution command message in a memory buffer of the compute engine.

Example 5 includes the subject matter of any of Examples 1-4, and wherein the extracted argument information includes one or more data values, and wherein to perform the TCAGE operation as a function of the extracted argument information comprises to perform a comparison operation as a function of at least one of the data values and another value.

Example 6 includes the subject matter of any of Examples 1-5, and wherein the one or more data values comprises a number of bytes of data that are to be fetched, wherein the other value comprises an expected amount of data to be fetched, and wherein to perform the TCAGE operation comprises to compare the number of bytes of data that are to be fetched and the expected amount of data to be fetched.

Example 7 includes the subject matter of any of Examples 1-6, and wherein to generate the triggering event as a function of the performed TCAGE operation comprises to perform, in response to a determination that additional data is to be fetched, a fetch operation based on the number of bytes of data that are to be fetched.

Example 8 includes the subject matter of any of Examples 1-7, and wherein the one or more data values comprises a categorical data type and quantitative data, wherein the other value comprises a supported categorical data type, and wherein to perform the TCAGE operation comprises to compare the categorical data type and the supported categorical data type.

Example 9 includes the subject matter of any of Examples 1-8, and wherein to generate the triggering event comprises to one of increment another event counter associated with the supported categorical data type or generate the triggering event to perform an operation on the quantitative data as a function of the categorical data type.

Example 10 includes the subject matter of any of Examples 1-9, and wherein the one or more data values comprises a reduction operation type and an amount of data, wherein the other value comprises a supported reduction operation type, wherein to perform the TCAGE operation comprises to compare the reduction operation type and the supported reduction operation type and, wherein to generate the triggering event as a function of the performed TCAGE operation comprises to increment, in response to a determination that the reduction operation type and the supported reduction operation type match, a value of another event counter associated with the supported reduction operation type to perform a reduction operation on the amount of data as a function of the supported reduction operation type.

Example 11 includes the subject matter of any of Examples 1-10, and wherein to update the value of the event counter comprises to one of increment the event counter, set the event counter to a predetermined value, or add a predetermined value to the value of the event counter.

Example 12 includes one or more machine-readable storage media comprising a plurality of instructions stored thereon that, in response to being executed, cause a compute device to receive an operation execution command message associated with a triggered operation that has been fired; process the received operation execution command message to (i) extract argument information from a payload of the received operation execution command and (ii) store the argument information in a data buffer of the compute engine; increment a value of an event counter associated with the fired triggered operation; perform a triggered compare-and-generate event (TCAGE) operation as a function of the extracted argument information; determine, in response to having performed TCAGE operation, whether to generate a triggering event; generate, in response to a determination that the triggering event is to be generated, the triggering event as a function of the performed TCAGE operation; insert the generated triggered event into a triggered operation queue; and update the value of the event counter.

Example 13 includes the subject matter of Example 12, and wherein to process the received operation execution command message to extract argument information from the received operation execution command comprises to process the received operation execution command message to extract argument information from a payload of the received operation execution command.

Example 14 includes the subject matter of any of Examples 12 and 13, and wherein to process the operation execution command message comprises to store a data payload of the transport layer payload of the received operation execution command message in a memory buffer of the compute engine.

Example 15 includes the subject matter of any of Examples 12-14, and wherein to process the operation execution command message comprises to store a triggered operation header of the received operation execution command message in a memory buffer of the compute engine.

Example 16 includes the subject matter of any of Examples 12-15, and wherein the extracted argument information includes one or more data values, and wherein to perform the TCAGE operation as a function of the extracted argument information comprises to perform a comparison operation as a function of at least one of the data values and another value.

Example 17 includes the subject matter of any of Examples 12-16, and wherein the one or more data values comprises a number of bytes of data that are to be fetched, wherein the other value comprises an expected amount of data to be fetched, and wherein to perform the TCAGE operation comprises to compare the number of bytes of data that are to be fetched and the expected amount of data to be fetched.

Example 18 includes the subject matter of any of Examples 12-17, and wherein to generate the triggering event as a function of the performed TCAGE operation comprises to perform, in response to a determination that additional data is to be fetched, a fetch operation based on the number of bytes of data that are to be fetched.

Example 19 includes the subject matter of any of Examples 12-18, and wherein the one or more data values comprises a categorical data type and quantitative data, wherein the other value comprises a supported categorical data type, and wherein to perform the TCAGE operation comprises to compare the categorical data type and the supported categorical data type.

Example 20 includes the subject matter of any of Examples 12-19, and wherein to generate the triggering event comprises to one of increment another event counter associated with the supported categorical data type or generate the triggering event to perform an operation on the quantitative data as a function of the categorical data type.

Example 21 includes the subject matter of any of Examples 12-20, and wherein the one or more data values comprises a reduction operation type and an amount of data, wherein the other value comprises a supported reduction operation type, wherein to perform the TCAGE operation comprises to compare the reduction operation type and the supported reduction operation type and, wherein to generate the triggering event as a function of the performed TCAGE operation comprises to increment, in response to a determination that the reduction operation type and the supported reduction operation type match, a value of another event counter associated with the supported reduction operation type to perform a reduction operation on the amount of data as a function of the supported reduction operation type.

Example 22 includes the subject matter of any of Examples 12-21, and wherein to update the value of the event counter comprises to one of increment the event counter, set the event counter to a predetermined value, or add a predetermined value to the value of the event counter.

Example 23 includes a compute device for generating triggered conditional events operations, the compute device comprising means for receiving an operation execution command message associated with a triggered operation that has been fired; means for processing the received operation execution command message to (i) extract argument information from a payload of the received operation execution command and (ii) store the argument information in a data buffer of the compute engine; means for incrementing a value of an event counter associated with the fired triggered operation; means for performing a triggered compare-and-generate event (TCAGE) operation as a function of the extracted argument information; means for determining, in response to having performed TCAGE operation, whether to generate a triggering event; means for generating, in response to a determination that the triggering event is to be generated, the triggering event as a function of the performed TCAGE operation; means for inserting the generated triggered event into a triggered operation queue; and means for updating the value of the event counter.

Example 24 includes the subject matter of Example 23, and wherein the extracted argument information includes one or more data values, and wherein the means for performing the TCAGE operation as a function of the extracted argument information comprises means for performing a comparison operation as a function of at least one of the data values and another value.

Example 25 includes the subject matter of any of Examples 23 and 24, and wherein the one or more data values comprises a number of bytes of data that are to be fetched, wherein the other value comprises an expected amount of data to be fetched, wherein the means for performing the TCAGE operation comprises means for comparing the number of bytes of data that are to be fetched and the expected amount of data to be fetched, and wherein the means for generating the triggering event as a function of the performed TCAGE operation comprises means for performing a fetch operation based on the number of bytes of data that are to be fetched.

The invention claimed is:

1. A compute device for generating triggered conditional events operations, the compute device comprising:
a compute engine; and
a host fabric interface (HFI) to:
receive an operation execution command message associated with a triggered operation that has been fired;
process the received operation execution command message to (i) extract argument information from a payload of the received operation execution command and (ii) store the argument information in a data buffer of the compute engine;
increment a value of an event counter associated with the fired triggered operation;
perform a triggered compare-and-generate event (TCAGE) operation as a function of the extracted argument information;
determine, in response to having performed TCAGE operation, whether to generate a triggering event;
generate, in response to a determination that the triggering event is to be generated, the triggering event as a function of the performed TCAGE operation;
insert the generated triggered event into a triggered operation queue; and
update the value of the event counter.

2. The compute device of claim 1, wherein to process the received operation execution command message to extract argument information from the received operation execution command comprises to process the received operation execution command message to extract argument information from a payload of the received operation execution command.

3. The compute device of claim 1, wherein to process the operation execution command message comprises to store a data payload of a transport layer payload of the received operation execution command message in a memory buffer of the compute engine.

4. The compute device of claim 1, wherein to process the operation execution command message comprises to store a triggered operation header of the received operation execution command message in a memory buffer of the compute engine.

5. The compute device of claim 1, wherein the extracted argument information includes one or more data values, and wherein to perform the TCAGE operation as a function of the extracted argument information comprises to perform a comparison operation as a function of at least one of the data values and another value.

6. The compute device of claim 5, wherein the one or more data values comprises a number of bytes of data that are to be fetched, wherein the other value comprises an expected amount of data to be fetched, and wherein to perform the TCAGE operation comprises to compare the number of bytes of data that are to be fetched and the expected amount of data to be fetched.

7. The compute device of claim 6, wherein to generate the triggering event as a function of the performed TCAGE operation comprises to perform, in response to a determination that additional data is to be fetched, a fetch operation based on the number of bytes of data that are to be fetched.

8. The compute device of claim 5, wherein the one or more data values comprises a categorical data type and quantitative data, wherein the other value comprises a supported categorical data type, and wherein to perform the TCAGE operation comprises to compare the categorical data type and the supported categorical data type.

9. The compute device of claim 8, wherein to generate the triggering event comprises to one of increment another event counter associated with the supported categorical data type or generate the triggering event to perform an operation on the quantitative data as a function of the categorical data type.

10. The compute device of claim 5, wherein the one or more data values comprises a reduction operation type and an amount of data, wherein the other value comprises a supported reduction operation type, wherein to perform the TCAGE operation comprises to compare the reduction operation type and the supported reduction operation type and, wherein to generate the triggering event as a function of the performed TCAGE operation comprises to increment, in response to a determination that the reduction operation type and the supported reduction operation type match, a value of another event counter associated with the supported reduction operation type to perform a reduction operation on the amount of data as a function of the supported reduction operation type.

11. The compute device of claim 1, wherein to update the value of the event counter comprises to one of increment the event counter, set the event counter to a predetermined value, or add a predetermined value to the value of the event counter.

12. One or more non-transitory machine-readable storage media comprising a plurality of instructions stored thereon that, in response to being executed, cause a compute device to:
receive an operation execution command message associated with a triggered operation that has been fired;
process the received operation execution command message to (i) extract argument information from a payload of the received operation execution command and (ii) store the argument information in a data buffer of a compute engine;
increment a value of an event counter associated with the fired triggered operation;

perform a triggered compare-and-generate event (TCAGE) operation as a function of the extracted argument information;

determine, in response to having performed TCAGE operation, whether to generate a triggering event;

generate, in response to a determination that the triggering event is to be generated, the triggering event as a function of the performed TCAGE operation;

insert the generated triggered event into a triggered operation queue; and update the value of the event counter.

13. The one or more non-transitory machine-readable storage media of claim 12, wherein to process the received operation execution command message to extract argument information from the received operation execution command comprises to process the received operation execution command message to extract argument information from a payload of the received operation execution command.

14. The one or more non-transitory machine-readable storage media of claim 12, wherein to process the operation execution command message comprises to store a data payload of a transport layer payload of the received operation execution command message in a memory buffer of the compute engine.

15. The one or more non-transitory machine-readable storage media of claim 12, wherein to process the operation execution command message comprises to store a triggered operation header of the received operation execution command message in a memory buffer of the compute engine.

16. The one or more non-transitory machine-readable storage media of claim 12, wherein the extracted argument information includes one or more data values, and wherein to perform the TCAGE operation as a function of the extracted argument information comprises to perform a comparison operation as a function of at least one of the data values and another value.

17. The one or more non-transitory machine-readable storage media of claim 16, wherein the one or more data values comprises a number of bytes of data that are to be fetched, wherein the other value comprises an expected amount of data to be fetched, and wherein to perform the TCAGE operation comprises to compare the number of bytes of data that are to be fetched and the expected amount of data to be fetched.

18. The one or more non-transitory machine-readable storage media of claim 17, wherein to generate the triggering event as a function of the performed TCAGE operation comprises to perform, in response to a determination that additional data is to be fetched, a fetch operation based on the number of bytes of data that are to be fetched.

19. The one or more non-transitory machine-readable storage media of claim 16, wherein the one or more data values comprises a categorical data type and quantitative data, wherein the other value comprises a supported categorical data type, and wherein to perform the TCAGE operation comprises to compare the categorical data type and the supported categorical data type.

20. The one or more non-transitory machine-readable storage media of claim 19, wherein to generate the triggering event comprises to one of increment another event counter associated with the supported categorical data type or generate the triggering event to perform an operation on the quantitative data as a function of the categorical data type.

21. The one or more non-transitory machine-readable storage media of claim 16, wherein the one or more data values comprises a reduction operation type and an amount of data, wherein the other value comprises a supported reduction operation type, wherein to perform the TCAGE operation comprises to compare the reduction operation type and the supported reduction operation type and, wherein to generate the triggering event as a function of the performed TCAGE operation comprises to increment, in response to a determination that the reduction operation type and the supported reduction operation type match, a value of another event counter associated with the supported reduction operation type to perform a reduction operation on the amount of data as a function of the supported reduction operation type.

22. The one or more non-transitory machine-readable storage media of claim 12, wherein to update the value of the event counter comprises to one of increment the event counter, set the event counter to a predetermined value, or add a predetermined value to the value of the event counter.

23. A compute device for generating triggered conditional events operations, the compute device comprising:

means for receiving an operation execution command message associated with a triggered operation that has been fired;

means for processing the received operation execution command message to (i) extract argument information from a payload of the received operation execution command and (ii) store the argument information in a data buffer of a compute engine;

means for incrementing a value of an event counter associated with the fired triggered operation;

means for performing a triggered compare-and-generate event (TCAGE) operation as a function of the extracted argument information;

means for determining, in response to having performed TCAGE operation, whether to generate a triggering event;

means for generating, in response to a determination that the triggering event is to be generated, the triggering event as a function of the performed TCAGE operation;

means for inserting the generated triggered event into a triggered operation queue; and means for updating the value of the event counter.

24. The compute device of claim 23, wherein the extracted argument information includes one or more data values, and wherein the means for performing the TCAGE operation as a function of the extracted argument information comprises means for performing a comparison operation as a function of at least one of the data values and another value.

25. The compute device of claim 24, wherein the one or more data values comprises a number of bytes of data that are to be fetched, wherein the other value comprises an expected amount of data to be fetched, wherein the means for performing the TCAGE operation comprises means for comparing the number of bytes of data that are to be fetched and the expected amount of data to be fetched, and wherein the means for generating the triggering event as a function of the performed TCAGE operation comprises means for performing a fetch operation based on the number of bytes of data that are to be fetched.

* * * * *